United States Patent
Huang et al.

(10) Patent No.: US 8,220,945 B2
(45) Date of Patent: Jul. 17, 2012

(54) ELECTRONIC BOOK

(75) Inventors: Bao-Jun Huang, Shenzhen (CN); Jing Wen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 261 days.

(21) Appl. No.: 12/761,352

(22) Filed: Apr. 15, 2010

(65) Prior Publication Data

US 2011/0122626 A1 May 26, 2011

(30) Foreign Application Priority Data

Nov. 20, 2009 (CN) .......................... 2009 1 0310140

(51) Int. Cl.
*A47B 19/00* (2006.01)

(52) U.S. Cl. ............................ 362/98; 362/154; 362/253
(58) Field of Classification Search ............... 362/98–99, 362/154–155, 253
See application file for complete search history.

(56) References Cited

U.S. PATENT DOCUMENTS

2008/0266865 A1* 10/2008 Lev et al. ...................... 362/287
2011/0164410 A1* 7/2011 Hebenstreit et al. .......... 362/154

* cited by examiner

*Primary Examiner* — Jason Moon Han
(74) *Attorney, Agent, or Firm* — Altis Law Group, Inc.

(57) ABSTRACT

An electronic book includes a shell and an illumination device. The shell defines a receiving groove. The illumination device includes a support arm fastened to the shell and an illumination member fixed on the support arm. The illumination device is received in the receiving groove when not in use. The electronic book can be read when the ambient light is too low or in darkness.

14 Claims, 3 Drawing Sheets

ELECTRONIC BOOK

BACKGROUND

1. Technical Field

The present disclosure relates to an electronic reading device, especially to an electronic book with an illumination device attached.

2. Description of Related Art

In recent years, electronic books have become more and more popular. An electronic book usually adopts an e-paper screen to display contents, but does not include backlighting lamps. The e-paper screen shows the contents by reflecting ambient light, thereby the information shown by the e-paper screen is often imperceptible in low ambient light or in darkness. Thus, users cannot use the electronic book in low ambient light or in darkness.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
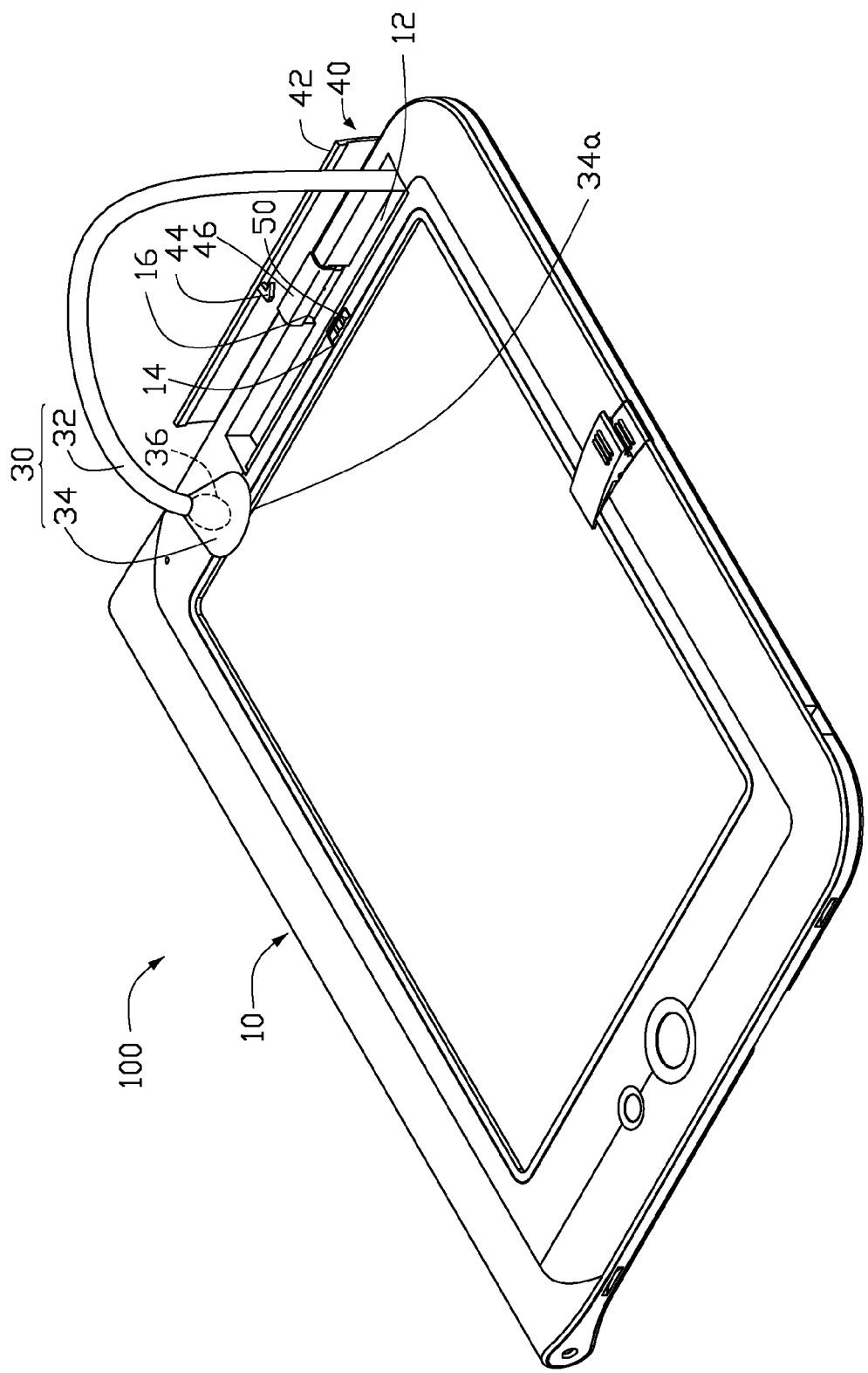
FIG. 1 is an isometric view of an electronic book, with an illumination device being used, according to an exemplary embodiment.

Referring to FIG. 1, an electronic book 100 according to an exemplary embodiment includes a shell 10, an illumination device 30, a locking member 50, and a door 40. The shell 10 defines a receiving groove 12 and an installing hole 14. The illumination device 30 can be received in the receiving groove 12. The locking member 50 is exposed through and slidable in the installing hole 14. The door 40 is configured for covering the receiving groove 12. One end of the door 40 is hinged with the shell 10, the other end of the door 40 detachably clasps to the locking member 50.

The illumination device 30 includes a support arm 32 fastened to the shell 10 in the receiving groove 12 and an illumination member 34 fixed on the support arm 32. The support arm 32 is made of ductile material and is able to bend in many directions. The illumination member 34 includes a light cover 34a and a light source 36 mounted in the light cover 34a. The light cover 34a is configured for emitting light emanated from the light source 36. In this embodiment, the light cover 34a is tapered. The light source 36 electronically connects to the electronic book 100. The illumination device 30 further includes a control switch for turning on and off the light source 36.

Figure 2:
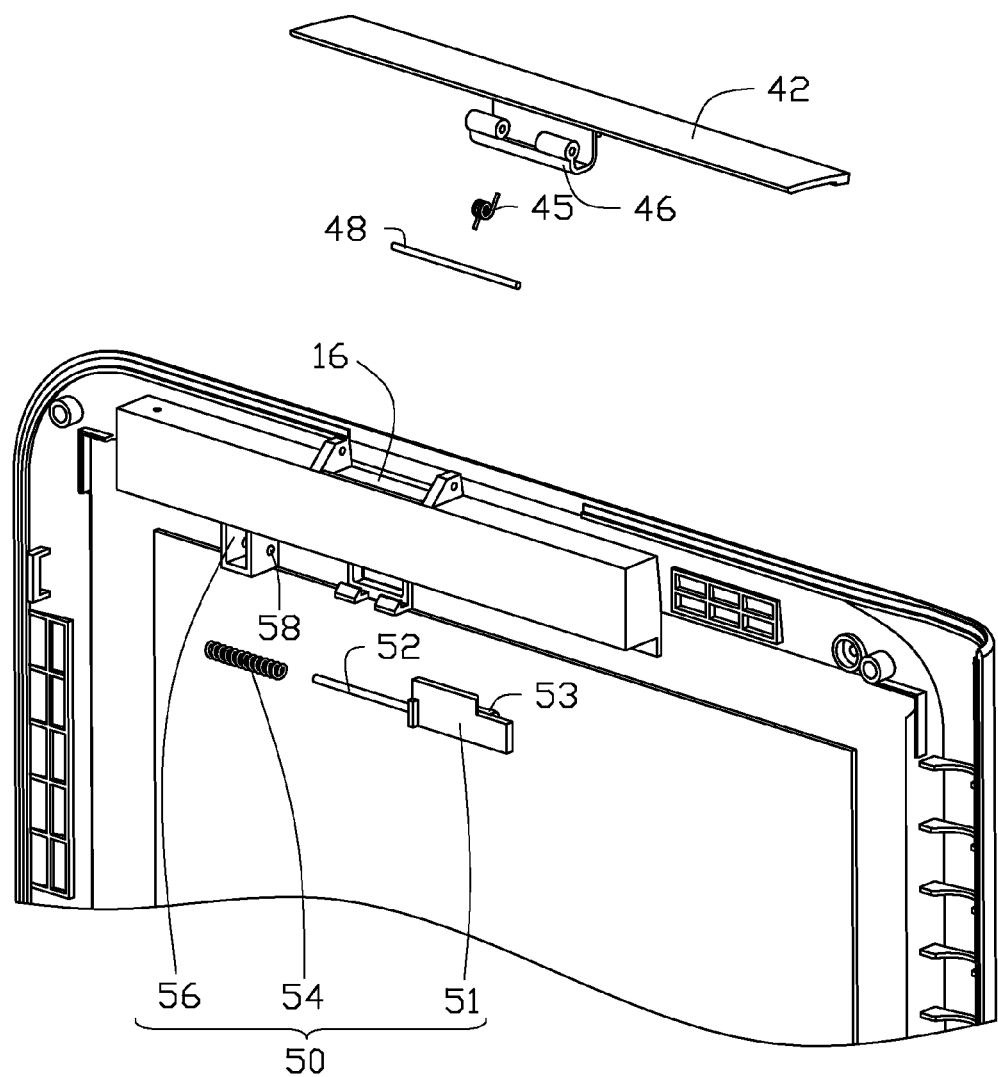
FIG. 2 is a partial, exploded view of FIG. 1.

Referring to FIGS. 1 and 2, the door 40 includes a shelter 42, a hook 44, a hinge 46, a shaft 48, and an elastic member 45. The shell 10 defines a slot 16 in a sidewall of the receiving groove 12. The hook 44 and the hinge 46 respectively extend from two opposite edges of the shelter 42. The hinge 46 is received in the slot 16. The hinge 46 includes two ends and a connecting portion connecting the two ends. The hinge 46 is substantially U shaped. The two ends of the hinge 46 are in parallel with each other. The connecting portion is perpendicular with the two ends. One end of the hinge 46 is connected to an edge of the shelter 42 and the other end of the hinge 46 forms hinge holes. In assembling, the shaft 48 extends through the hinge holes and is mounted to the shell 10, thus, rotatably fixes the door 40 to the shell 10. The elastic member 45 is fit over the shaft 48 for providing elastic force to open the door 40 when the door 40 is opened. In this embodiment, the elastic member 45 is a torsion spring.

The locking member 50 includes a main body 51, a spring 54, and a resisting portion 56. The main body 51 is configured for clasping the hook 44 of the door 40. The detail of the clasping structure is omitted, as it is familiar to a person skilled in the art. A shaft 52 protrudes from one end of the main body 51. The spring 54 is fit over the shaft 52. The resisting portion 56 is fixed on the shell 10 and defines a through hole 58 for receiving and holding the shaft 52. A bolt block 53 protrudes from the main body 51. The length of the bolt block 53 is smaller than that of the installing hole 14. The bolt block 53 extends out of the shell 10 through the installing hole 14. The bolt block 53 can slide in the installing hole 14 to drive the main body 51 to slide correspondingly.

Figure 3:
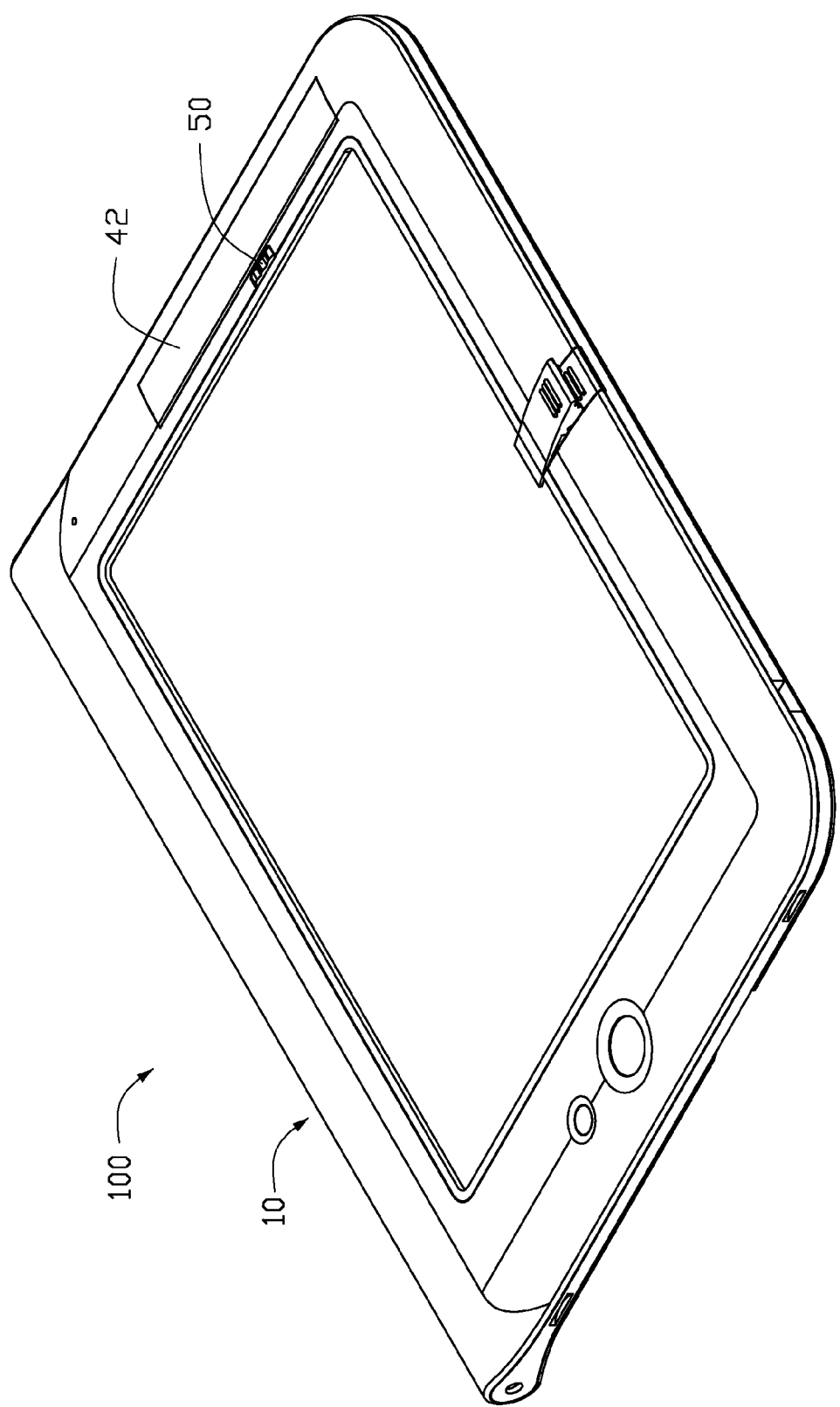
FIG. 3 is an isometric view of the electronic book in FIG. 1, with the illumination device received in the receiving groove.

Referring to FIGS. 1 and 3, when the illumination device 30 is not in use, the illumination device 30 is received in the receiving groove 12, the hook 44 of the door 40 buckles with the main body 51 of the locking member 50, the spring 54 pushes the main body 51 to confirm the clasp connection. By closing the door 40, the illumination device 30, is received in the receiving groove 12.

When using the illumination device 30, the locking member 50 are moved to make the hook 44 unclasp from the main body 51, the door 40 is opened under the force of the elastic member 45. Then the support arm 32 of the illumination device 30 can be taken out of the receiving groove 12 for use.

The electronic book 100 includes the illumination device 30, thus, user can read the electronic book 100 when the ambient light is too low or in darkness. Furthermore, the illumination device 30 is received in the receiving groove 12 and is covered by the door 40 when not in use, thus not affecting the appearance of the electronic book 100.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic book reader comprising:
   a shell of the electronic book reader defining a receiving groove;
   an illumination device, comprising a support arm fastened to the shell and an illumination member fixed on the support arm, wherein the illumination device is received in the receiving groove when not in use; and
   a door for covering the receiving groove and a lock member for locking the door on the shell, wherein the shell defines an installing hole, the lock member is exposed through and slidable in the installing hole.

2. The electronic book of claim 1, wherein the illumination member comprises a light cover and a light source mounted in the light cover.

3. The electronic book of claim 2, wherein the light cover is tapered.

4. The electronic book of claim 1, wherein the lock member comprises a main body clasping the door and a bolt block protruded from the main body, the length of the bolt block is smaller than that of the installing hole, the bolt block extends out of the shell through the installing hole, when the bolt block is moved, the main body to slide correspondingly.

5. The electronic book of claim 4, wherein a shaft protrudes from one end of the main body, the lock member further comprises a spring fit over the shaft, and a resisting portion fixed on the shell, the resisting portion receives and holds the shaft.

6. The electronic book of claim 1, wherein the shell defines an slot communicated with the receiving groove, the door comprises a hook for clasping the lock member, a hinge passing through the slot, a shaft, and an elastic member, wherein the shaft extends through the hinge and is mounted to the shell to rotatably fix the door to the shell via the hinge, the elastic member is fit over the shaft for providing elastic force to open the door.

7. The electronic book of claim 6, wherein the hook and the hinge respectively extend from two opposite edges of the shelter.

8. An electronic book reader comprising:
a shell of the electronic book reader defining a receiving groove;
an illumination device comprising a support arm and an illumination member, wherein one end of the support arm is fastened to the shell in the receiving groove, the illumination member is fixed to the other end of the support arm, the support arm is ductile to bend, the illumination device is received in the receiving groove when not in use; and
a door for covering the receiving groove and a lock member for locking the door on the shell, wherein the shell defines an installing hole, the lock member is exposed through and slidable in the installing hole.

9. The electronic book of claim 8, wherein the illumination member comprises a light cover and a light source mounted in the light cover.

10. The electronic book of claim 9, wherein the light cover is tapered.

11. The electronic book of claim 8, wherein the lock member comprises a main body clasping the door and a bolt block protruded from the main body, the length of the bolt block is smaller than that of the installing hole, the bolt block extends out of the shell through the installing hole, when the bolt block is moved, the main body to slide correspondingly.

12. The electronic book of claim 11, wherein a shaft protrudes from one end of the main body, the lock member further comprises a spring fit over the shaft, and a resisting portion fixed on the shell, the resisting portion receives and holds the shaft.

13. The electronic book of claim 8, wherein the shell defines an slot communicated with the receiving groove, the door comprises a hook for clasping the lock member, a hinge passing through the slot, a shaft, and a elastic member, wherein the shaft extends through the hinge and is mounted to the shell to rotatably fix the door to the shell via the hinge, the elastic member is fit over the shaft for providing elastic force to open the door.

14. The electronic book of claim 13, wherein the hook and the hinge respectively extend from two opposite edges of the shelter.

* * * * *